United States Patent [19]

Kobayashi et al.

[11] Patent Number: 5,060,090
[45] Date of Patent: Oct. 22, 1991

[54] AUTOMATIC STORAGE SYSTEM AND METHOD FOR INFORMATION RECORDING MEDIA

[75] Inventors: Takashi Kobayashi, Kawasaki; Kenzo Kurihara, Tokyo; Takashi Doi; Masaru Teranishi, both of Hadano; Yoshihiro Uchiyama, Odawara; Soichi Oyama, Yokohama; Isao Tsushima, Yamato; Norihisa Komoda, Kawasaki; Ai Tanaka, Zama; Kenichi Kageura, Fujisawa; Minoru Kosuge, Odawara, all of Japan

[73] Assignee: Hitachi, Ltd., Tokyo, Japan

[21] Appl. No.: 381,990

[22] Filed: Jul. 19, 1989

[30] Foreign Application Priority Data

Jul. 22, 1988 [JP] Japan .................................. 63-181903
Jul. 22, 1988 [JP] Japan .................................. 63-182894
Apr. 19, 1989 [JP] Japan .................................. 1-97308

[51] Int. Cl.$^5$ ...................... G11B 15/68; G11B 17/00; G11B 17/22
[52] U.S. Cl. ........................................ 360/71; 360/92; 369/35
[58] Field of Search ................. 360/92, 71; 369/34–37

[56] References Cited

U.S. PATENT DOCUMENTS 3,831,197 8/1974 Beach et al. .......................... 360/92
3,938,190 2/1976 Semmlow et al. .................... 360/92
4,864,438 9/1989 Munro ................................... 360/92
4,891,720 1/1990 Grant .................................... 360/92

Primary Examiner—David J. Severin
Assistant Examiner—Jefferson Evans
Attorney, Agent, or Firm—Antonelli, Terry, Stout & Kraus

[57] ABSTRACT

When the mount and demount operation of information media are achieved between an information medium storage shelf and a plurality of recording/playback apparatuses by use of a plurality of handling devices, in order to execute the operations in a concurrent fashion without causing an interference between the handling devices for an increased operation efficiency, the area of the storage shelf and at least one of the recording/playback apparatuses are respectively subdivided into a plurality of subareas so as to process the obtained subareas by the plurality devices respectively associated therewith.

17 Claims, 14 Drawing Sheets

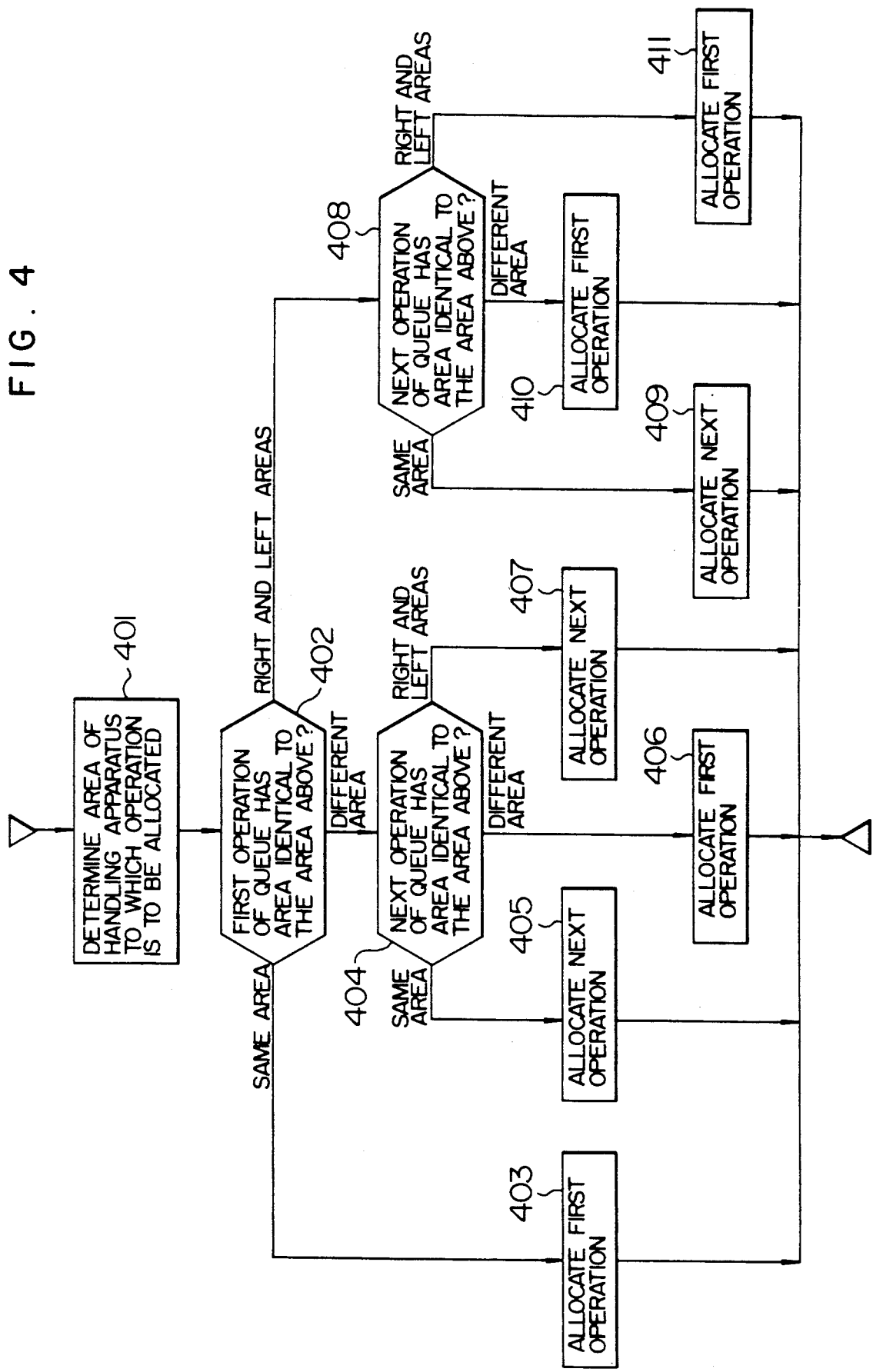

FIG. 5A

| INTERFERENCE CHECK JUDGE CRITERIA | | | JUDGE RESULT |
|---|---|---|---|
| OPERATION OCCUPATION AREAS NOT OVERLAPPED | | LEFT ⟶ ⫽⫽<br>⫽⫽⟵ RIGHT | OK<br>(EXECUTE OPERATION) |
| OPERATION OCCUPATION AREAS OVERLAPPED | PARTNER IN OPERATION | LEFT ⟶⊢<br>⊢⟵ RIGHT | NG<br>(AWAIT TERMINATION OF OPERATION OF PARTNER) |
| | PARTNER IN INTERFERENCE WAIT STATE | ⫽⟵ LEFT<br>RIGHT ⊢⤳ NEXT OPERATION OF PARTNER | NG (START OPERATION OF PARTNER AND WAIT FOR TERMINATION OF THE OPERATION) |
| | PARTNER NOT IN OPERATION | ⊢⟶ LEFT<br>RIGHT ○ | OK<br>(SAVE PARTNER AND EXECUTE OPERATION) |

FIG. 5B

OPERATION OCCUPATION AREA IS AREA BETWEEN MAXIMUM REACH POINT AND THE TOP POINT OF OWN AREA REFER TO DIAGRAM BELOW

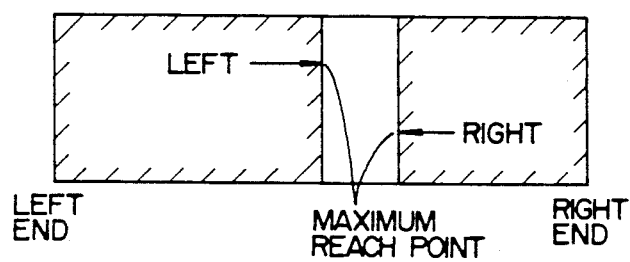

LEFT END     MAXIMUM REACH POINT     RIGHT END

SAVE IF NECESSARY

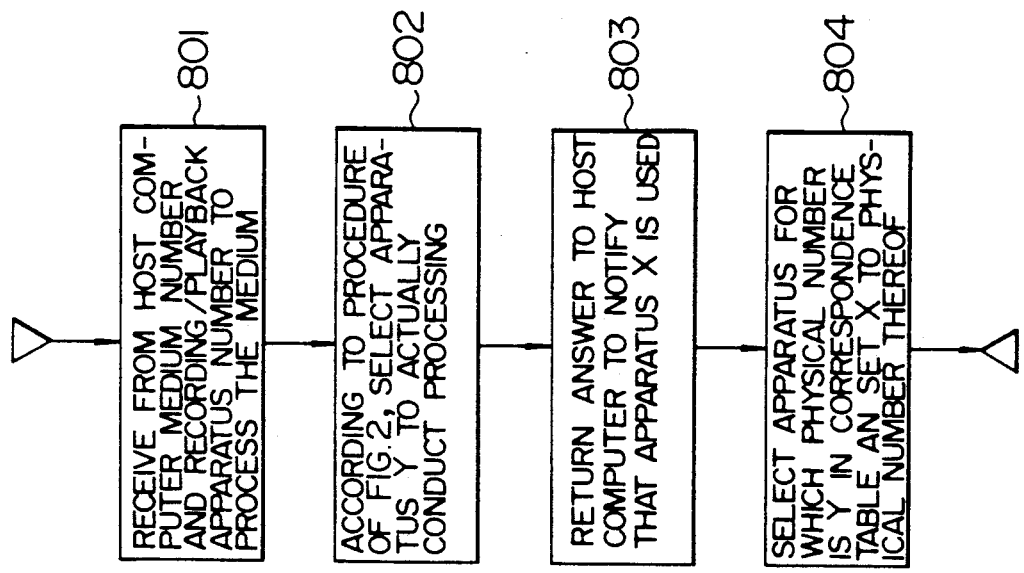

FIG. 9

| MEDIUM No. \ MEDIUM No. | 1 | 2 | 3 | 4 | 5 | 6 | 7 | 8 |
|---|---|---|---|---|---|---|---|---|
| 1 | | 1 | 10 | 1 | 2 | 1 | 7 | 1 |
| 2 | | | 5 | 1 | 1 | 0 | 0 | 3 |
| 3 | | | | 7 | 2 | 1 | 0 | 0 |
| 4 | | | | | 0 | 0 | 1 | 0 |
| 5 | | | | | | 2 | 10 | 0 |
| 6 | | | | | | | 0 | 1 |
| 7 | | | | | | | | 1 |
| 8 | | | | | | | | |

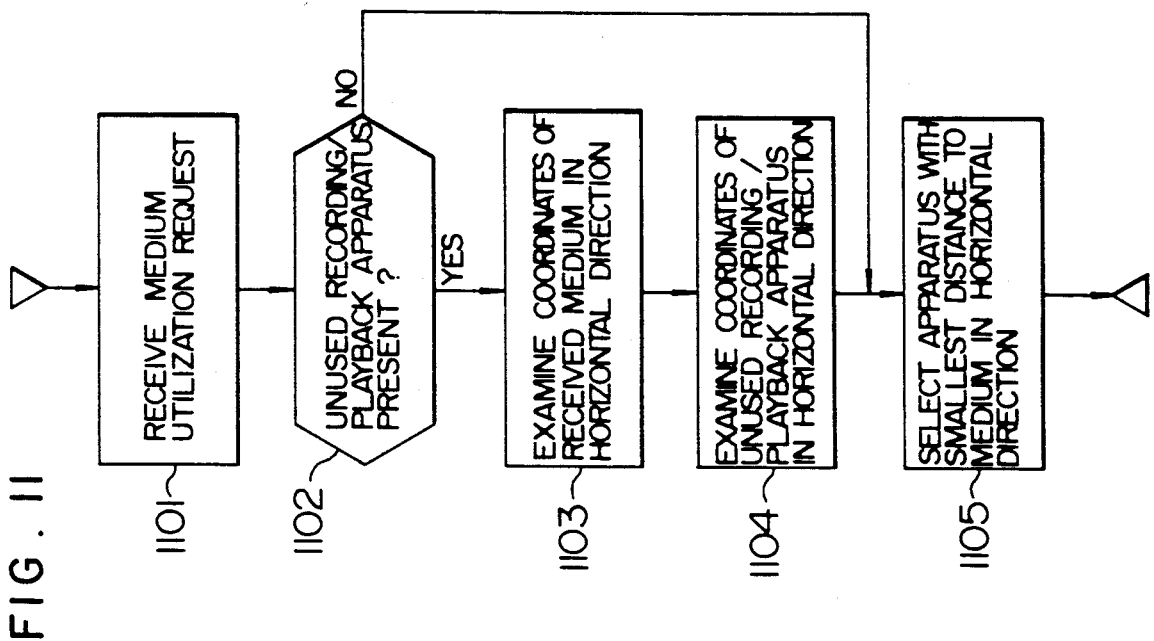

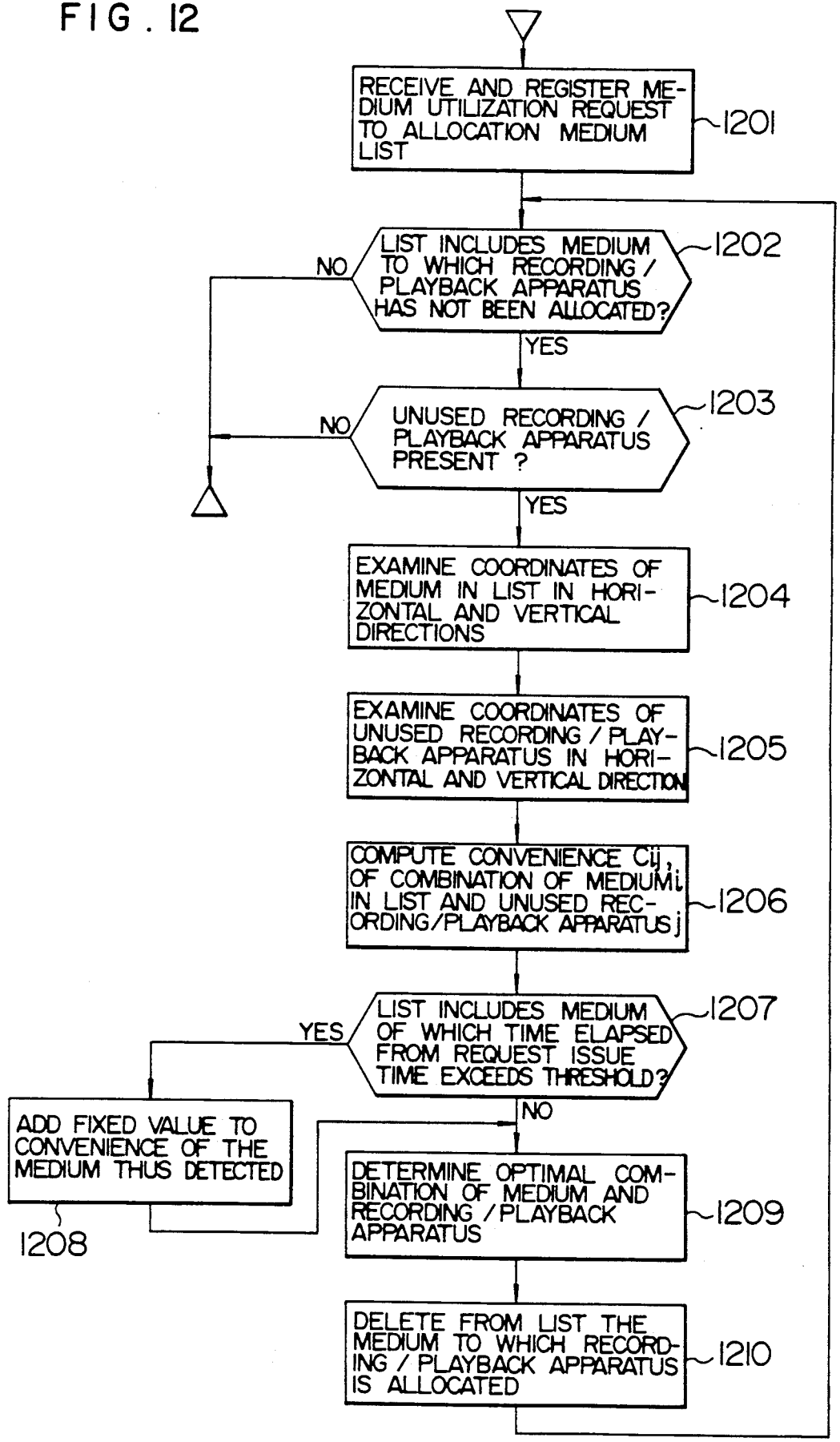

FIG. 15

| NAME OF MEDIUM TO BE TRANSPORTED | OPERATION TYPE | MEDIUM PICK-UP POSITION | | MEDIUM RELEASE POSITION | | DELAYED COUNT |
|---|---|---|---|---|---|---|
| | | HOLIZONTAL DIRECTION | VERTICAL DIRECTION | HOLIZONTAL DIRECTION | VERTICAL DIRECTION | |
| 87015 | MOUNT | 200 | 50 | 225 | 70 | 0 |
| 87079 | MOUNT | 750 | 20 | 820 | 90 | 1 |
| 88005 | DEMOUNT | 50 | 120 | 250 | 20 | 0 |
| 86351 | DEMOUNT | 350 | 50 | 10 | 75 | 0 |
| 87192 | MOUNT | 935 | 125 | 650 | 105 | 0 |

FIG. 17

| NAME OF MEDIUM TO BE TRANSPORTED | OPERATION TYPE | MEDIUM PICK-UP POSITION | | MEDIUM RELEASE POSITION | | DELAYED COUNT | ALLOCATION PRIORITY | ALLOCATION POSSIBILITY JUDGEMENT |
|---|---|---|---|---|---|---|---|---|
| | | HOLIZONTAL DIRECTION | VERTICAL DIRECTION | HOLIZONTAL DIRECTION | VERTICAL DIRECTION | | | |
| 87015 | MOUNT | 200 | 15 | 225 | 70 | 0 | 2 | NG |
| 87079 | MOUNT | 750 | 20 | 820 | 90 | 1 (RIGHT) | 1 | OK |

FIG. 18

| RESULT OF ALLOCATION POSSIBILITY JUDGEMENT | POSSIBILITY OF CONCURRENT OPERATION | CONDITION JUDGE EXPRESSION | EXAMPLE ALLOCATION OBJECTIVE OPERATION ⟹ ─── OPERATION IN EXECUTION  LEFT ⟷ RIGHT |
|---|---|---|---|
| ALLOCATION POSSIBLE | CONCURRENT OPERATION POSSIBLE FOR PICK-UP AND STORE | (NOTE 2) ALLOCATION TO LEFT HD: END POINT OF OPERATION BEING EXECUTED BY RIGHT HD − START POINT OF ALLOCATION OBJECTIVE OPERATION ≧ L (NOTE 1) ALLOCATION TO RIGHT HD: END POINT OF OPERATION BEING EXECUTED BY LEFT HD − START POINT OF ALLOCATION OBJECTIVE OPERATION ≦ −L | ↑  ↓ |
| ALLOCATION POSSIBLE | CONCURRENT OPERATION POSSIBLE ONLY FOR PICK-UP (OWN WAIT STATE) |  | ↓  ↓ |
| ALLOCATION POSSIBLE | CONCURRENT OPERATION POSSIBLE ONLY FOR STORE (PARTNER WAIT STATE) | ALLOCATION FOR LEFT HD: START POINT OF OPERATION BEING EXECUTED BY RIGHT HD − START POINT OF ALLOCATION OBJECTIVE OPERATION ≧ L & START POINT OF OPERATION BEING EXECUTED BY RIGHT HD − END POINT OF ALLOCATION OBJECTIVE OPERATION ≧ L ALLOCATION TO RIGHT HD: START POINT OF OPERATION BEING EXECUTED BY LEFT HD − START POINT OF ALLOCATION OBJECTIVE OPERATION ≦ −L & END POINT OF OPERATION BEING EXECUTED BY LEFT HD − END POINT OF ALLOCATION OBJECTIVE OPERATION ≦ −L | ↓  ↓ |
| ALLOCATION INHIBITED | CONCURRENT OPERATION ENTIRELY IMPOSSIBLE | OTHER THAN THOSE ABOVE | ↓ |

(NOTE 1) L IS THE APPROACH LIMIT BETWEEN THE RIGHT AND LEFT HANDLING APPARATUSES
(NOTE 2) HD STANDS FOR A HANDLING DEVICE

AUTOMATIC STORAGE SYSTEM AND METHOD FOR INFORMATION RECORDING MEDIA

BACKGROUND OF THE INVENTION

The present invention relates to an automatic storage system for information recording media, and in particular, to a system and a method in which a plurality of handling apparatuses for automatically achieving mount and/or demount operations of information recording media (to be simply referred to as information media herebelow) are enabled to develop the mount and/or demount operations at a high speed without causing any interference therebetween.

In various fields such as the financial facilities, securities, transportation, and manufacturing industries, there has been developed an automation of respective jobs in an online fashion. With such advancement of jobs, the amount of the respective data items including online data and other related data has been rapidly increasing. In most cases, the user possesses a stock room or storage facility for storing therein a great amount of information media on which data has been recorded such that the system operation is conducted through operations to take out therefrom or to restore therein the media necessary for the daily job.

Heretofore, an operation to take out a necessary information medium from a storage shelf so as to install or to mount the medium in a recording/playback apparatus (to be called a mount operation) and an operation to remove the information medium from the recording/playback apparatus and to restore it in the storage shelf (to be called a demount operation) are carried out as follows in accordance with a manual of the Hitachi Computer Series M, "Comprehensive Operation Management System HOPPS". That is, the user requests the host computer to conduct processing to record data on a medium or to reproduce data from a medium. On receiving the request, the computer system supplies the operator with a medium name, a storage location, a recording/playback apparatus name. Furthermore, when the processing of the medium is completed, there is also reported information including a recording/playback apparatus name associated with the medium and a location to which the medium is to be returned. Based on these information items thus reported, the operator conducts the mount and demount operations. As described above, in case that the operations are manually achieved, it is possible to effect an efficient job only by specifying the medium name, the storage location, and the recording/playback apparatus.

On the other hand, due to an abrupt increase in the volume of the information media to be stored, the number of steps required for the operations to mount and/or to demount information media comes to be considerably great, and hence it is difficult to manually accomplish these operations. In such a situation, attention has been given to an information medium automatic storing system or an automatic storage system for information recording media in which there are provided a storage shelf for storing therein information media, a plurality of recording/playback apparatuses, and a plurality of handling apparatuses to automatically achieve the mount and demount operations. In a case of this automatic storage system, the mount and/or demount operations are effected by the plural handling apparatuses, not by the operators. In general, in a case where operations are effected in a parallel or concurrent fashion by use of a plurality of handling apparatuses, there appear interferences of operations among the apparatuses due to physical restrictions thereof. For example, in a case of a structure where two handling apparatuses travel on a rail, during an operation in which one of the handling apparatuses on the left side of the rail conducts a job in a right end section, it is impossible for the other one of the handling apparatuses on the right side of the rail to initiate a job. Consequently, like in the conventional case, if the computer issues job instructions to the handling apparatuses employed in place of the operators without paying attention to the locations where the operations are to be conducted, there may occur in many cases difficulties as trouble like in the example above, in which the jobs cannot be concurrently achieved and hence the job efficiency is lowered. As a solution to the problem, there has been considered a method in which two rails are disposed to enable the respective handling apparatuses to independently conduct the operations or jobs, thereby improving the physical structure. However, this method is attended with difficulties in practice, for example, due to the restrictions associated with space and cost.

SUMMARY OF THE INVENTION

It is therefore an object of the present invention to enable a plurality of handling apparatuses to achieve the operations without causing interferences among the operations thereof and to reduce the average time required for a job so as to increase the amount of work accomplished in a unit period of time.

In order to achieve the object above, there are provided the following means.

(1) Means for selecting recording/playback apparatus

A recording/playback apparatus is selected so that the area or region of the shelf in which the information medium requested by the user is stored matches with the area associated with the recording/playback apparatus in which the medium is to be mounted.

(2) Means for assigning operations to handling apparatuses

Mount and/or demount operations awaiting execution are assigned to handling apparatuses so that the area of each operation may accord with the area which is alloted to the respective handling apparatuses in advance.

(3) Means for controlling operations of handling apparatuses

In a case where the operations cannot be shared among the apparatus as described above by use of the means (1) and (2), namely, when a handling apparatus is required to effect an operation in a range or an area other than a range assigned thereto, there is effected a control so that the operation does not interfere with the operations of the other apparatuses.

(4) Means for rearranging information media

In order to equalize the operation loads imposed on the respective handling apparatuses, there is conducted a rearrangement or reallocation of information media such that information media which are frequently used at the same time are distributed to the different areas for the storage thereof.

In order to enable the plural handling apparatuses to operate in a concurrent fashion, an appropriate recording/playback apparatus is assigned to a medium requested by the user; moreover, an operation to transport the medium determined as a result is assigned to an appropriate handling apparatus. For this purpose, for each handling apparatus, there are determined storage shelves and recording/playback apparatuses accessible from the apparatus, thereby determining the operation area assigned to the handling apparatus. In this situation, each handling apparatus undergoes the selection such that the medium transport operation is conducted within the determined area. Moreover, each operation is assigned to a handling apparatus which is associated with an area of the operation. Specifically, the respective means are assigned with the following operations.

(1') Selection of recording/playback apparatus

The space in the automatic information medium storing system is subdivided into areas or zones each including at least a storage shelf and at least a recording/playback apparatus. The selection of a recording/playback apparatus is effected such that an area of a storage shelf associated with an information medium requested by the user matches with an area of a recording/playback apparatus on which the information medium is to be mounted.

(2') Assignment of operation to handling apparatuses

An operation to mount a requested information medium on a recording/playback apparatus selected in the operation (1) above or an operation to demount an information medium from a recording/playback apparatus is assigned to a plurality of handling apparatuses. The assignment is effected, to the extent possible, so that the area of each operation may accord with the area which is alloted to the respective handling apparatuses in advance. In a case where a plurality of operations to be achieved are included in a queue, for each apparatus, an operation of an area associated therewith is selected for the assignment.

(3') Control of operation of handling apparatus

There may occur a case where the operation area cannot be assigned through the operation steps (1') and (2'). For example, in the operation (1'), when all recording/playback apparatuses associated with an area identical to the area of the storage shelf of the information medium are in use, there is selected an apparatus associated with a different area. Moreover, in the operation (2'), when there successively occur operations of a particular area, a handling apparatus is required to process an operation associated with an area not assigned thereto. In such a case where it is required for a handling apparatus to effect an operation in an area other than its own area, the operation of the handling apparatus is controlled so that the parallel operation can be carried out without causing an interference to the operations of the other apparatuses.

(4') Rearrangement of information media

In order to equalize the operation loads imposed on the plural handling apparatuses, the information media are rearranged or reallocated such that information media to be frequently used at the same time are distributed to different areas or regions for the storage thereof. A group of the information media which are frequently used at the same time is determined through learning based on actual data collected through the operation of the storage system.

BRIEF DESCRIPTION OF THE DRAWINGS

These and other objects and advantages of the present invention will become apparent by reference to the following description and accompanying drawings wherein:

FIG. 4 is a flowchart useful to explain a procedure for assigning operations based on the levels;

FIG. 5A is a diagram showing judge criteria for an interference check of the handling apparatus;

FIG. 5B is a schematic diagram useful to explain the interference check;

FIG. 7 is a diagram showing a correspondence table associated with correspondences between actual apparatuses and virtual apparatuses in a case where a recording/playback apparatus is specified in advance;

FIG. 8 is a schematic diagram showing a procedure of processing to be executed by use of the correspondence table;

FIG. 9 is an actual utilization result table of actual usage results employed to find out media which are frequently used at the same time;

FIG. 11 is a flowchart showing a procedure to allocate recording/playback apparatuses in consideration of the distance to the medium storage shelf and the magnitude of interference between handling apparatuses (on assumption that the request from the user is received each time the preceding request is processed);

FIG. 12 is a diagram showing a flow of the allocation procedure (on assumption that a plurality of requests are received from the user);

FIG. 13 is a schematic diagram showing an example of an allocation medium list;

FIG. 15 is a diagram schematically showing an example of an execution awaiting operation list;

FIG. 17 is a schematic diagram showing an example of an allocation objective operation list; and FIG. 18 is a diagram showing example of conditional expressions employed in the allocation possibility judgement.

DESCRIPTION OF THE PREFERRED EMBODIMENTS

Figure 1A:
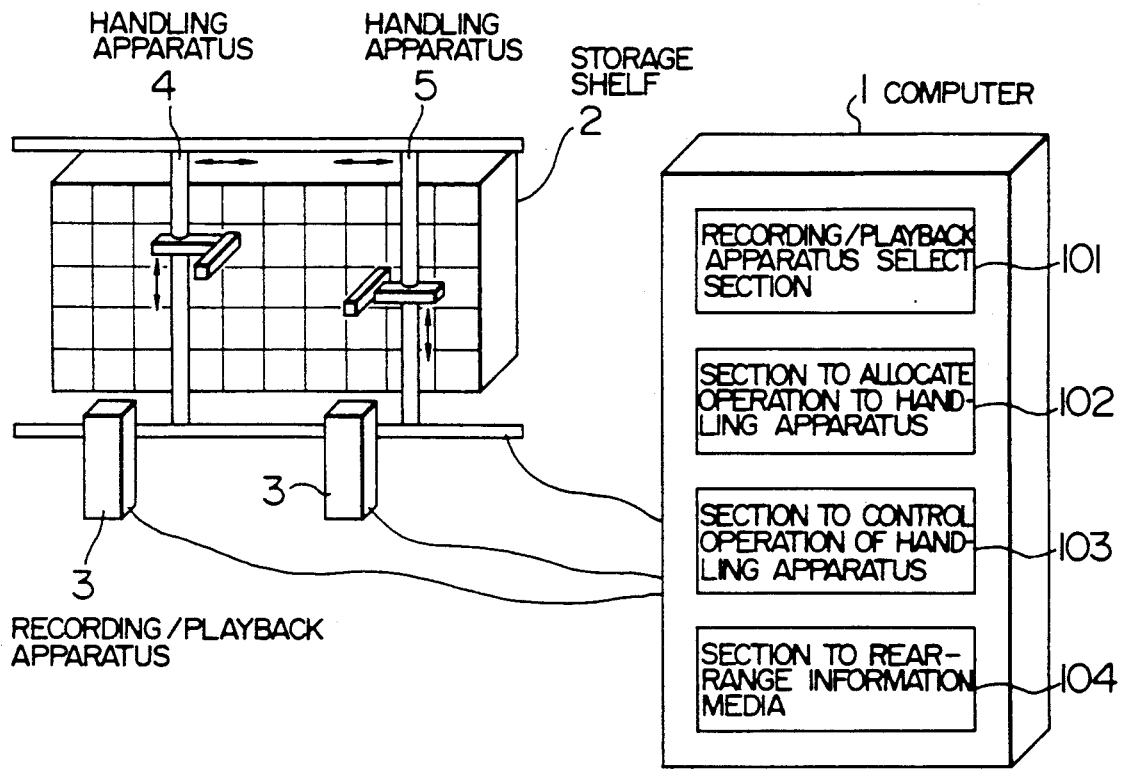
FIG. 1A is an overall configuration diagram showing an automatic medium storage system according to the present invention.

Referring now to the drawings, description will be given of an embodiment according to the present invention. In this embodiment, although there are provided two handling apparatuses, the system can be implemented in the similar fashion when three or more handling apparatuses are included.

Figure 1B:
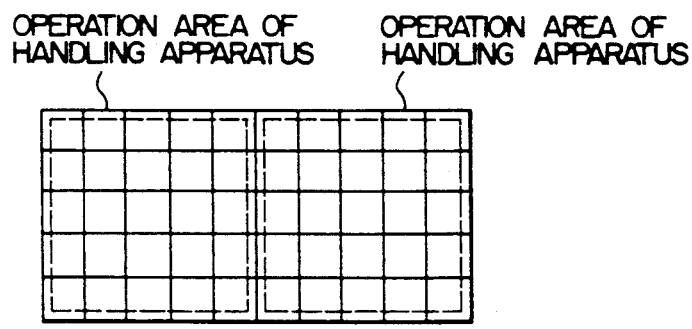
FIG. 1B is a schematic diagram showing operation areas or regions of handling apparatuses of the system of FIG. 1.

FIG. 1 shows an overall constitution of an automatic information medium storage system as an embodiment according to the present invention. The configuration of FIG. 1 includes a computer 1 for effecting a control of the overall system, and the computer 1 comprises a section 101 for selecting a recording/playback apparatus, a section 102 for allocating an operation to a handling apparatus, a section 103 for controlling an operation of a handling apparatus, and a section 104 for rearranging information media. The system further includes a storage shelf 2 for storing information media therein, a recording/playback apparatus 3 for recording information on an information medium and for reproducing information recorded thereon, and handling apparatuses 4 and 5 each for automatically conducting an operation to take out an information medium from the storage shelf 2 so as to mount the medium in a recording/playback apparatus 3 and/or an operation to remove the medium from the recording/playback apparatus 3 so as to restore the medium to the storage shelf 2. The structure of the handling apparatuses 4 and 5 is such that a vertical pole is disposed on a rail arranged along the storage shelf 3 so as to travel thereon in a horizontal direction and a hand is attached on the pole so as to move vertically thereon. As described above, in a case where two handling apparatuses 4 and 5 travel on a rail, there may occur interference therebetween in many cases. For example, while the apparatus 4 is operating at a right end section of the storage system, if an instruction is supplied to the apparatus 5 to conduct an operation on the left end section of the storage system, the operation of the apparatus 5 cannot be initiated until the operation of the apparatus 4 is completed. Furthermore, in this embodiment, as shown in FIG. 1B, it is assumed that the storage system is subdivided into two areas including a right area and a left area such that operations of the right and left areas are assigned to the right and left handling apparatuses, respectively.

Figures 2, 3:
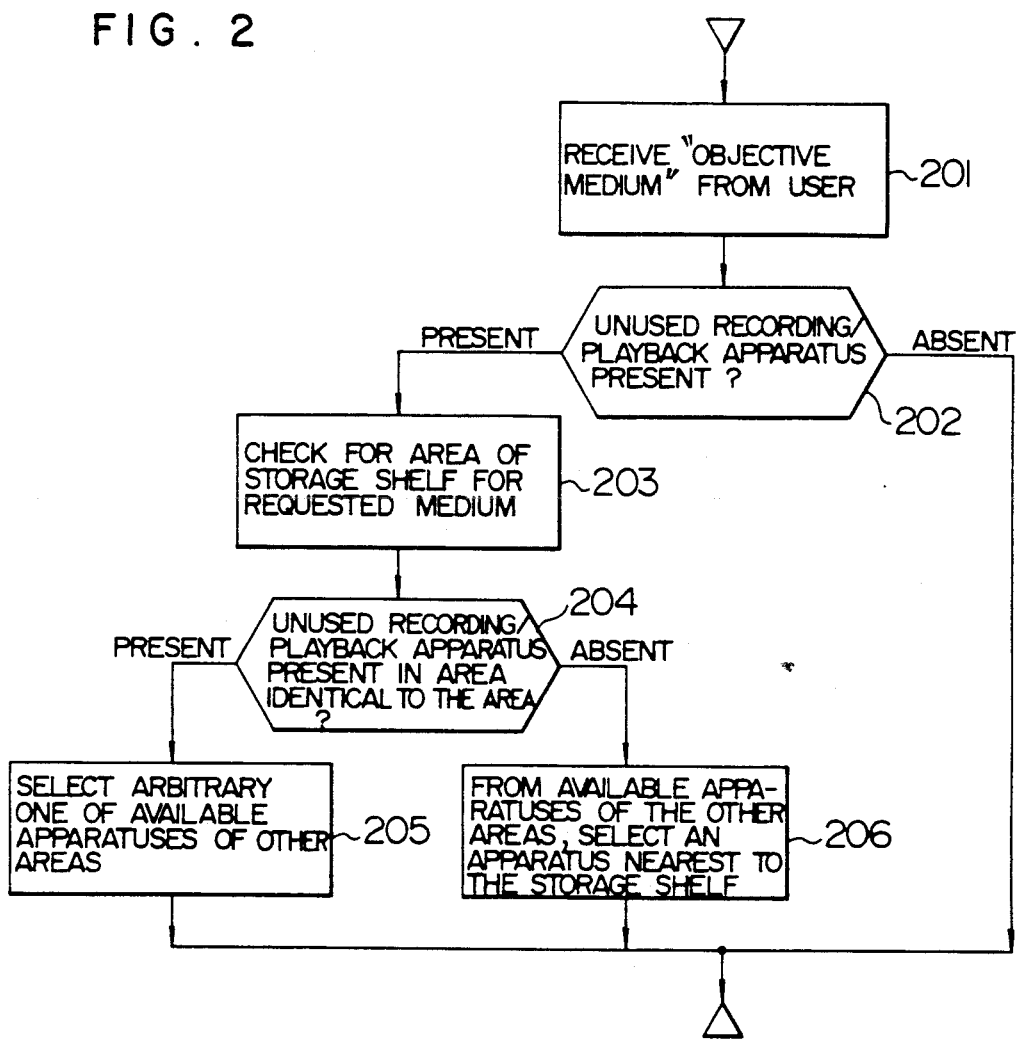
FIG. 2 is a flowchart showing a selection procedure of a recording/playback apparatus.
FIG. 3 is a diagram showing levels or criteria for assigning operations to handling apparatuses.

First, referring to FIG. 2, description will be given of a procedure to select a recording/playback apparatus which processes a specified information medium.

Step 201: A request for an objective medium or "Which one of information media is to be used" is received from the user.

Step 202: The system judges to determine whether or not an unused or available recording/playback apparatus is present in the storage system. If the apparatus is present, control proceeds to step 203; otherwise, the selection of the apparatus is impossible and hence the processing is finished.

Step 203: Judgement is conducted to determine an area in which the storage shelf of the requested medium is located.

Step 204: The system judges to determine whether or not an unused recording/playback apparatus is present in the idential area. If the apparatus is present, control proceeds to step 205; otherwise, control is passed to step 206.

Step 205: The system selects an arbitrary one of the available recording/playback apparatuses in the same area.

Step 206: From the available recording/playback apparatuses, the system selects an apparatus which is nearest to the area of the storage shelf associated with the requested medium.

Next, description will be given of a procedure to allocate a mount or demount operation to a plurality of handling apparatuses.

In order to minimize the wait time of the requests from the user, the first-in first-out (FIFO) algorithm is adopted as a principle in the allocation of the operation. However, in a case where the first operation of the queue is associated with an area other than an area of a handling apparatus to be processed, the range of the allocation is extended up to the next operation in the queue such that a total of two operations are subjected to a selection according to the priority levels as follows.

Priority level 1: Operation of the area identical to that of the handling apparatus.

Priority level 2: Operation astriding two areas including a right area and a left area.

Priority level 3: Operation of a different area

In addition, in order to prevent an operation execution from being delayed, the operation having the lower priority level is hence set to a wait state again and is assigned with the highest priority in the next priority assignment. These conditions are summarized in FIG. 3.

Referring next to FIG. 4, description will be given of a specific allocation procedure.

Step 401: The system judges to determine an area of a handling apparatus to which the operation is to be allocated.

Step 402: Judgement is conducted to determine whether or not an area of the first operation in the queue is identical to the area above. If this is the case, control is passed to step 403; otherwise, the processing proceeds to step 404; furthermore, if the area astrides the right and left areas, control is transferred to step 408.

Step 403: The allocation is effected for the first operation of the queue.

Step 404: The system determines whether or not an area of the next operation in the queue is identical to the area above. If this is the case, control transfers to step 405; otherwise, the processing proceeds to step 406; furthermore, if the area astrides the right and left areas, control is transferred to step 407.

Step 405: The allocation is effected for the next operation of the queue.

Step 406: The allocation is effected for the first operation of the queue.

Step 407: The allocation is effected for the next operation of the queue.

Step 408: The system determines whether or not an area of the next operation in the queue is identical to the area above. If this is the case, control transfers to step 409; otherwise, the processing proceeds to step 410; furthermore, if the area astrides the right and left areas, control is transferred to step 411.

Step 409: The allocation is effected for the next operation of the queue.

Step 410: The allocation is effected for the first operation of the queue.

Step 411: The allocation is effected for the first operation of the queue.

Next, description will be given of a procedure to control operations of a plurality of handling apparatuses.

The operation of a handling apparatus is subdivided into an operation to move to an information medium so as to take out the medium and an operation to transport the medium, so that the interference check is carried out only at an initiation of each operation. If OK results in the interference check, the pertinent operation is started; whereas if NG results, the initiation is set to a wait state to await the completion of the operation conducted by the other handling apparatus. The interference check is effected based on criteria associated with positional relationships between the following two areas.

Figure 6:
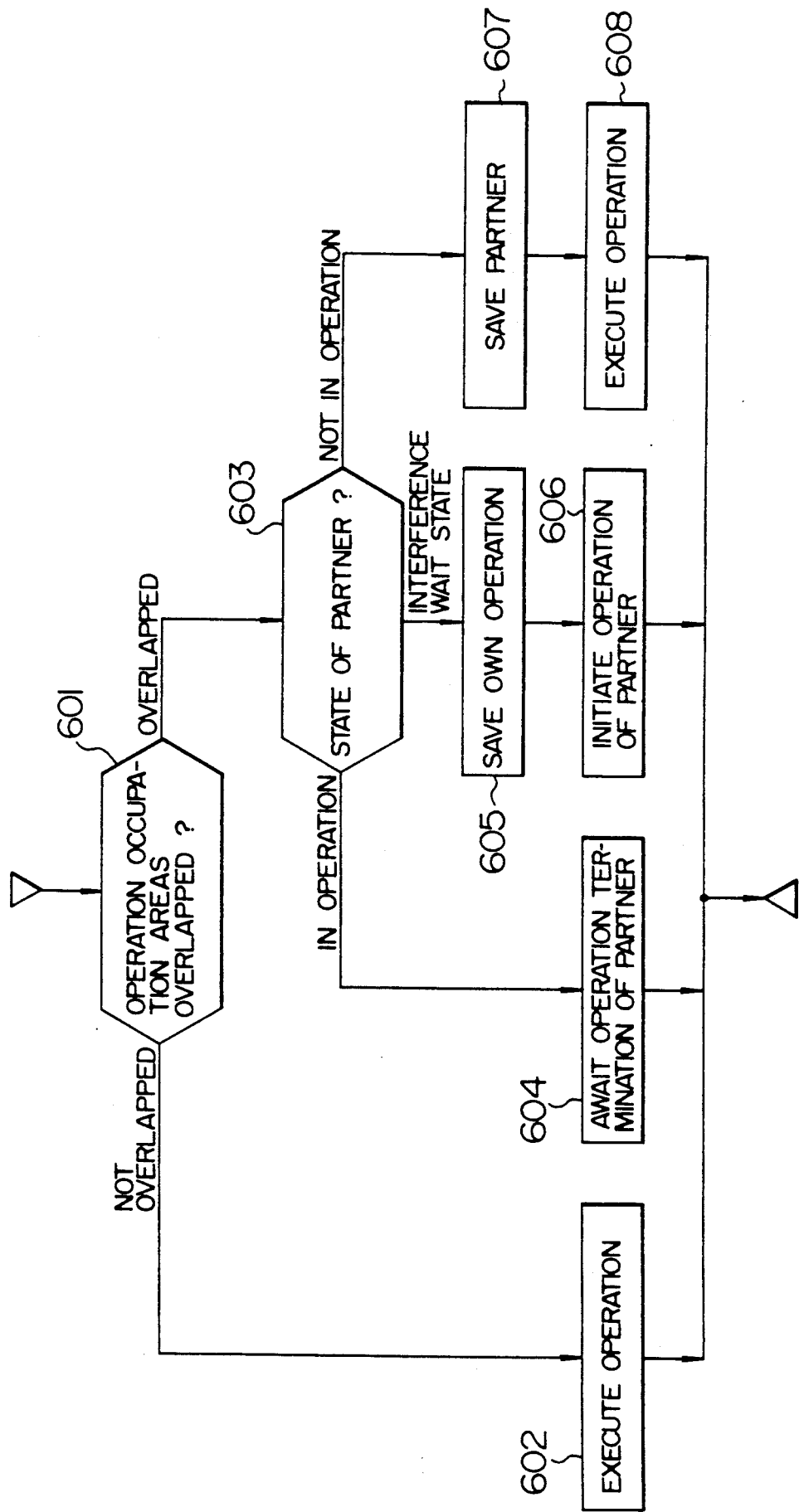
FIG. 6 is a flowchart showing an operation control procedure based on the criteria.

The maximum space occupied in the storage system when the operation of one apparatus is started is one operation occupation area and the area occupied in the storage system when the partner apparatus continues the operation is a partner operation occupation area. In this situation, if the one operation occupation area does not overlap with the partner operation occupation area, OK results in the interference check; otherwise, NG results. FIG. 5 shows specific judge results. Referring now to FIG. 6, the operation control procedure will be described.

Step 601: In a case where an operation is allocated to either one or both of the handling apparatuses 4 and 5 or where an operation thereof is completed, the system judges to determine whether or not there exists an overlapped portion between the operation occupation areas by paying attention to the pertinent handling apparatus. If the overlap is not detected, control proceeds to step 602; otherwise, the control is passed to step 603.

Step 602: The next operation is initiated.

Step 603: The operation state of the partner apparatus is checked. If the partner is in operation, processing proceeds to step 604; if the partner is in an interference wait state, control is passed to step 605; and if the partner is not in operation, the processing proceeds to step 607.

Step 604: The system waits for a point of time when the operation of the partner apparatus is finished.

Step 605: A save operation is effected so as not to interfere the next operation of the partner.

Step 606: The next operation of the partner apparatus is started and the one operation is set to a wait state awaiting the completion of the initiated operation.

Step 607: A save operation is effected on the partner apparatus so as not to interfere the next operation of the one apparatus.

Step 608: The operation is started.

Description has been given of an example in which a recording/playback apparatus can be selected depending on a location of the storage shelf associated with the information medium. Next, description will be given of a procedure to cope with a case where a recording/playback apparatus is selected depending on a criterion other than the location of the storage shelf and is beforehand specified.

As already described, conventionally, when the mount and demount operations are manually achieved, a recording/playback apparatus is selected by the operating system (OS) of the host computer regardless of a position of storage shelf where the objective medium is located. In order to apply the control method according to the present invention to the system under control of the conventional operating system above, there is developed a dynamic management of the correspondences between the virtual apparatuses and the apparatuses actually used for each apparatus selection such that an answer that the specified apparatus is used is supplied to the operating system of the host computer and that actually, the apparatus is selected so as to match an area of the apparatus with an area of the storage shelf of the medium. As a result, the system operates as if the specified apparatus were actually utilized.

Specifically, as shown in FIG. 7, there is produced a correspondence table including correspondences between the actual apparatus identification numbers (to be called physical numbers) and the virtual apparatus identification numbers (to be called logical numbers) so as to control the table in accordance with the following procedure (refer to FIG. 8 for details).

Step 801: There is received from the host computer a request indicating "which one of the media is to be processed in which one of the recording/playback apparatus". Assume here that the specified apparatus has an identification number X.

Step 802: According to the procedure of FIG. 2, the system selects a recording/playback apparatus associated with an area identical to the area of the storage shelf of the specified medium. Assume here that the selected apparatus has an identification number Y.

Step 803: To the host computer, there is returned an answer that the specified recording/playback apparatus is utilized.

Step 804: From the correspondence table of FIG. 7, the system selects an apparatus having a physical number identical to the number X to be actually used. The apparatus number Y of the specified apparatus is registered to a field of the logical number associated with the apparatus. In this case, in order to set a unit logical number, if there exists any apparatus having the logical number Y, the data thereof are entirely deleted. Operations such as a processing completion report and a failure occurrence report to the host computer are achieved by use of the logical number.

Finally, description will be given of a procedure to rearrange the information media.

First, the actual results are checked to determine media which are frequently used at the same time. For this purpose, there is prepared an actual usage result table as shown in FIG. 9 such that during the storage system operation, the count of the simultaneous usages of the media is recorded therein. For example, in a case where the media 1 and 3 are simultaneously requested for use, one is added to the frequency value in the field defined by row 1 and column 3 of this table. The contents of the table are examined at a predetermined interval, and in a case where there exists a pair of media having a frequency value exceeding a threshold value, a check is effected to determine whether the media are stored in the same area. If this is the case, one of the media is moved to another area of the storage shelf.

Incidentally, when such actual result data is used, there exists in many cases a condition that recent data is to be processed with a higher priority or importance and the data in the past are rather to be ignored. In this situation, there is not employed a procedure of the example above in which when the utilization request occurs at the same time, and one is simply added to the frequency value in the actual usage result table; that is, a multiplication of a weight $\alpha(\alpha<1)$ is conducted on all frequency values already registered to the actual result table so as to thereafter effect the addition of one. As a result, the latest data includes the added one, whereas the past data includes only the weight of $+\alpha^n$ (n is the count of the updates effected on the actual result table after the data is registered thereto).

Figure 10:
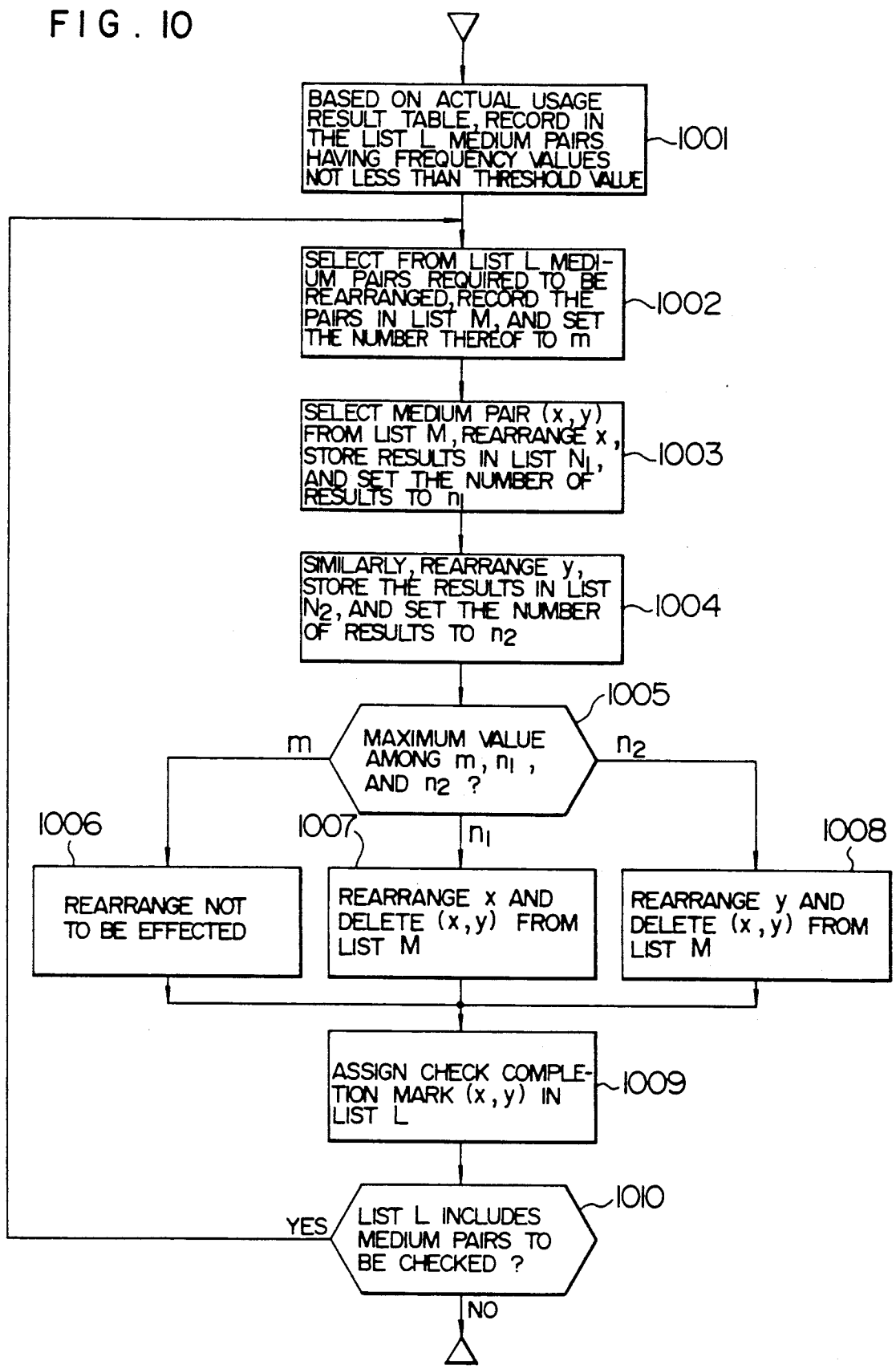
FIG. 10 is a flowchart showing a procedure to rearrange information media based on the actual utilization result table.

Next, referring to FIG. 10, description will be given of a procedure to select information media for rearrangement thereof.

Step 1001: From the actual utilization result table of FIG. 9, there are extracted all pairs of media associated with a frequency value equal to or more than a threshold value so as to record the identification names and frequency values thereof in the list L. For example, assuming the threshold value to be seven in FIG. 9, four pairs including media 1 and 3, media 1 and 7, media 3 and 4, and media 5 and 7 are recorded as shown in FIG. 11.

Step 1002: From the contents of the list L, there are selected pairs of media which are kept in the same area so as to record information thereabout in the list M. Furthermore, the number of medium pairs is counted in the list M. Assume here the number is m.

Step 1003: From the list M, there is selected a medium pair (x, y) having the largest frequency value so as to move one of the media, for example, the medium x to a different area. Thereafter, there is selected a pair of media stored in the same area so as to be recorded in the list $N_1$. In addition, the number of the medium pairs is counted in the list $N_1$. Assume here the number is $n_1$.

Step 1004: Subsequently, in the similar fashion, the other one, for example, the medium y of the paired media (x, y) is moved to a different area. Thereafter, there is selected a pair of media stored in the same area so as to be recorded in the list $N_2$. In addition, the number of the medium pairs is counted in the list $N_2$. Assume here the number is $n_2$.

Step 1005: The system determines the maximum value among the numbers m, $n_1$, and $n_2$ representing the medium pairs in the three lists M, $N_1$, and $N_2$, respectively. If the maximum value is m, $n_1$, or $n_2$, control is transferred to step 1006, 1007, or 1008, respectively.

Step 1006: The rearrangement is not conducted.

Step 1007: Of the pair of media (x, y) the medium x is rearranged in another area, and then the medium pair (x, y) is deleted from the list M.

Step 1008: Of the pair of media (x, y), the medium y is rearranged in another area, and then the medium pair (x, y) is deleted from the list M.

Step 1009: A check completion mark is assigned to the medium pair (x, y) in the list L.

Step 1010: The system judges to determine whether or not there exists any medium pair to be checked in the list L. If there exists a remaining pair, control is passed to step 1002; otherwise, the processing is terminated.

Next, description will be given of an embodiment in which the selection of a recording/playback apparatus is achieved depending on two criteria as follows.

1: Distance between the storage shelf of the medium and the drive unit.

2: Magnitude of occurrence of interference between handling apparatuses in the medium transportation.

In this embodiment, since the system is configured such that two handling apparatuses travel on a rail, for the prevention of the interference, it is indispensable to avoid an overlapping between the operation areas of the handling apparatuses. Moreover, the interference less frequently occurs when the operation distance of each handling apparatus in the horizontal direction is reduced. In consequence, it is devised to select and to allocate a recording/playback apparatus such that the horizontal direction between the storage shelf and the drive unit is minimized to be as small as possible. More concretely, the selection of the recording/playback apparatus is accomplished in the following procedure (refer to FIG. 11 for details).

Step 1101: From the user, there is received a request indicating an objective information medium and then an identification name is received.

Step 1102: The system judges to determine whether or not there exists any unused or available recording/playback apparatus in the storage system. If this is the case, control is passed to step 1103; otherwise, the processing is finished because the selection of the apparatus is impossible.

Step 1103: For the medium accepted from the user, the system conducts a check for coordinate values of the medium in the storage shelf in the horizontal and vertical directions. Assume here the coordinate values are expressed as (Xd, Yd).

Step 1104: For all available recording/playback apparatuses, a check is effected to attain coordinate values thereof in the horizontal and vertical directions. Assume here the coordinate values are expressed as (Xj, Yj), (j∈Set of available decks).

Step 1105: There is selected a recording/playback apparatus s having the shortest distance to the medium storage shelf in the horizontal direction as follows.

$$s = \{j \mid j \in \text{Set of available decks} \& |Xd - Xj| \rightarrow \min.\}$$

In the example described above, a request is accepted at a time from the user so as to select an appropriate recording/playback apparatus. Next, description will be given of a method in which a plurality of requests are accepted from the user so as to select recording/playback apparatuses suitable for the requests (refer to FIG. 12 for details).

Step 1201: The system receives a plurality of requests for objective information media and then receives the identification names thereof and the values of time of issuance of the usage requests so as to register these items to an allocation medium list as shown in FIG. 13.

Step 1202: A check is conducted to determine whether or not there exists any medium to which a recording/playback apparatus has not been allocated. If this is the case, control is transferred to step 1203; otherwise, the processing is finished.

Step 1203: The system effects a check to determine whether or not the storage system includes any unused recording/playback apparatus. If there exists an unused or available apparatus, control is passed to step 1204; otherwise, the allocation of the apparatus is impossible and hence the processing is finished.

Step 1204: For all information media in the allocation medium list, the system checks the coordinate values thereof in the storage shelf in the horizontal and vertical directions.

Step 1205: For all unused recording/playback apparatuses, a check is conducted to determine the coordinate values thereof in the horizontal and vertical directions.

Step 1206: For all combinations between the media i (i=1, 2, ...) in the allocation medium list and the unused drive units j (j=1, 2, ...), the system computes values of convenience $C_{ij}$ of the combinations. In this operation, the value of $C_{ij}$ is set to be greater if the storage shelf of the medium and the recording/playback apparatus are associated with the same area; whereas the value of $C_{ij}$ is decreased if the medium and the recording/playback apparatus relate to different areas. Furthermore, the value of $C_{ij}$ is increased as the horizontal distance between the medium and the apparatus is decreased. For example, the value of $C_{ij}$ is determined as follows.

$$C_{ij} = K \cdot W_{ij} + M \cdot |X_i - X_j|$$

where, $W_{ij} = 1$ (i and j are associated with the same area)

$W_{ij} = 0$ (i and j are associated with the different areas) and

K and M are each a value equal to or more than 0.

Step 1207: Judgement is conducted to determine whether or not the allocation medium list includes any medium of which a period of time elapsed from the request issue time exceeds a predetermined threshold value. If this is the case, control is passed to step 1208; otherwise, the processing proceeds to step 1209.

Step 1208: In order to effect the allocation with priority on a group of media determined by the judgement of the procedure 1207, a fixed value is added to the convenience value for each of the media as follows; thereafter, control is passed to procedure 1209.

$$C_{ij} = C_{ij} + N$$

where, N is an arbitrary value equal to or more than 0.

Step 1209: The following allocation problem is solved so as to attain the optimal combinations between the group of requested media and the group of unused or available recording/playback apparatuses.

$$\sum_i \sum_j C_{ij} X_{ij} \rightarrow \max.$$

where, $X_{ij} = 1, 0$ $$\sum_i X_{ij} = 1$$

$$\sum_j X_{ij} = 1$$

Step 1210: The system removes from the allocation medium list a group of media to which the recording/playback apparatuses are allocated as a result of the procedure step 1209, and then processing proceeds to the procedure 1202.

Figure 14:
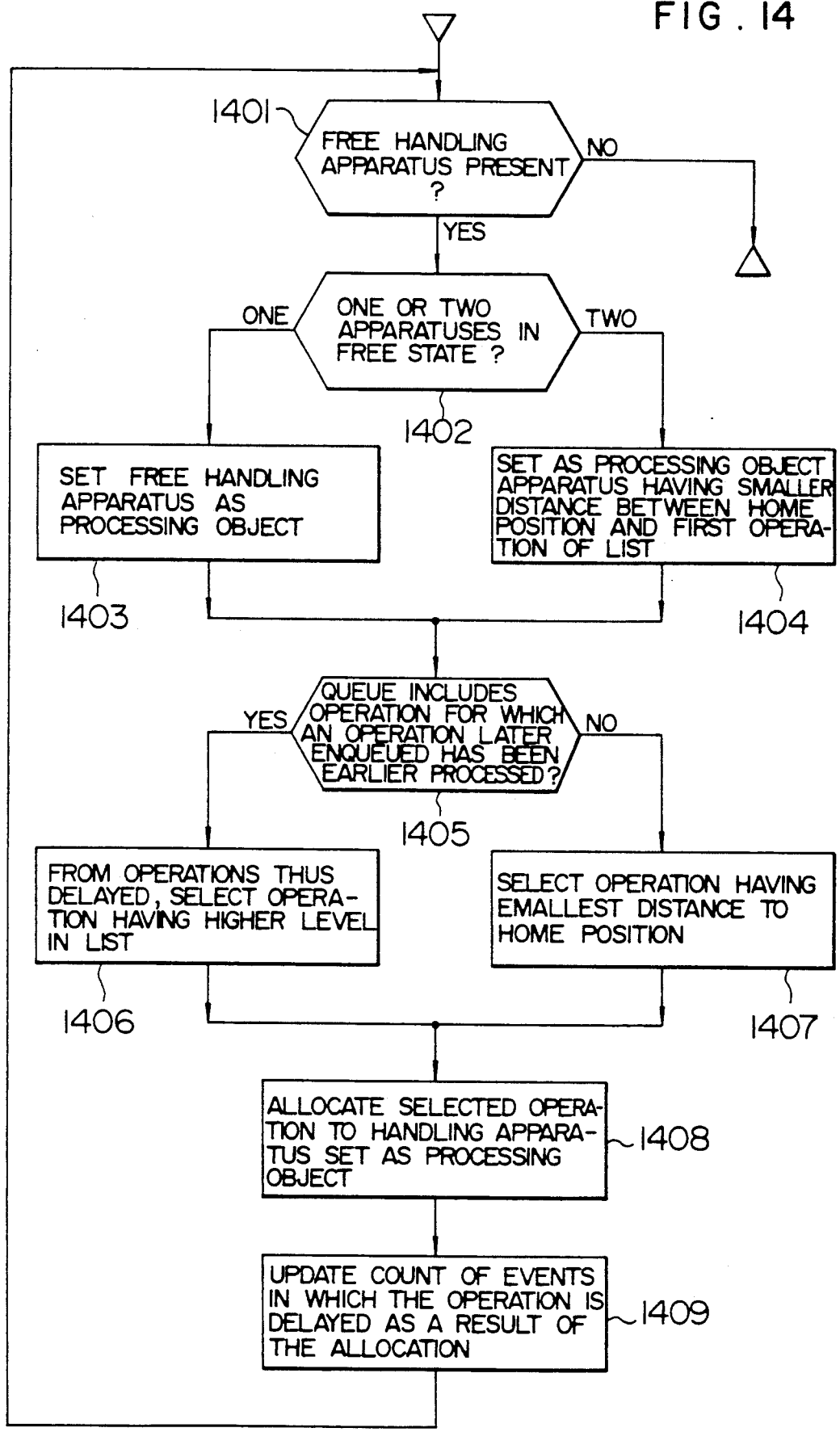
FIG. 14 is a flowchart showing a procedure to allocate handling apparatuses in consideration of the frequency of the occurrence of interferences between the handling apparatuses at a point when the operation is to be executed.

Subsequently, description will be given of a method of allocating operations to handling apparatus in which the operations are selected such that the operation areas of the two handling apparatuses do not overlap with each other and hence there exists a reduced possibility of the interference therebetween at an execution of the allocation, at a point of time preceding the execution, or at both of the points of time (refer to FIG. 14 for details). FIG. 15 shows an example of an execution wait operation list.

Step 1401: The system judges to determine whether or not there exists any handling apparatus in a free state. If this is the case, control is transferred to step 1402; otherwise, the processing is finished.

Step 1402: A check is conducted to determine the number of the free handling apparatuses. For one free apparatus, control is passed to step 1403, and if two apparatuses are free, processing proceeds to step 1404.

Step 1403: Control is transferred to step 1405 with the free handling apparatus set to a processing object.

Step 1404: A check is achieved for each free apparatus to determine a distance between a home position thereof (the left end of the storage system for the left-hand apparatus; the right end of the storage system for the right-hand apparatus) and an operation position (for example, an intermediate point between the operation start point and the operation end point) of the first operation queued in the execution wait operation list, so that one of the handling apparatuses associated with the smaller distance is set as an object of the processing. Thereafter, control is passed to step 1405.

Step 1405: A check is conducted to determine whether or not there exists any operations for which an operation having a greater sequential number in the queue has been earlier processed. If this is the case, control is transferred to step 1406; otherwise, the processing step 1407 is effected.

Step 1406: From the operations determined in the step 405, the system selects an operation registered with a higher level in the execution wait operation list; thereafter control is passed to step 1408.

Step 1407: The system selects an operation associated with the smallest distance between the home position and the operation position, and then procedure 1408 is effected.

Step 1408: The selected operation is allocated to the handling apparatus set as a processing object.

Step 1409: For each operation in the execution wait operation list or the execution queue list, the system updates the count of events in which this operation is delayed because an operation having the greater sequential number or having been later registered to the queue has been earlier processed as compared with this operation; thereafter, control is passed to step 1401.

Figure 16:
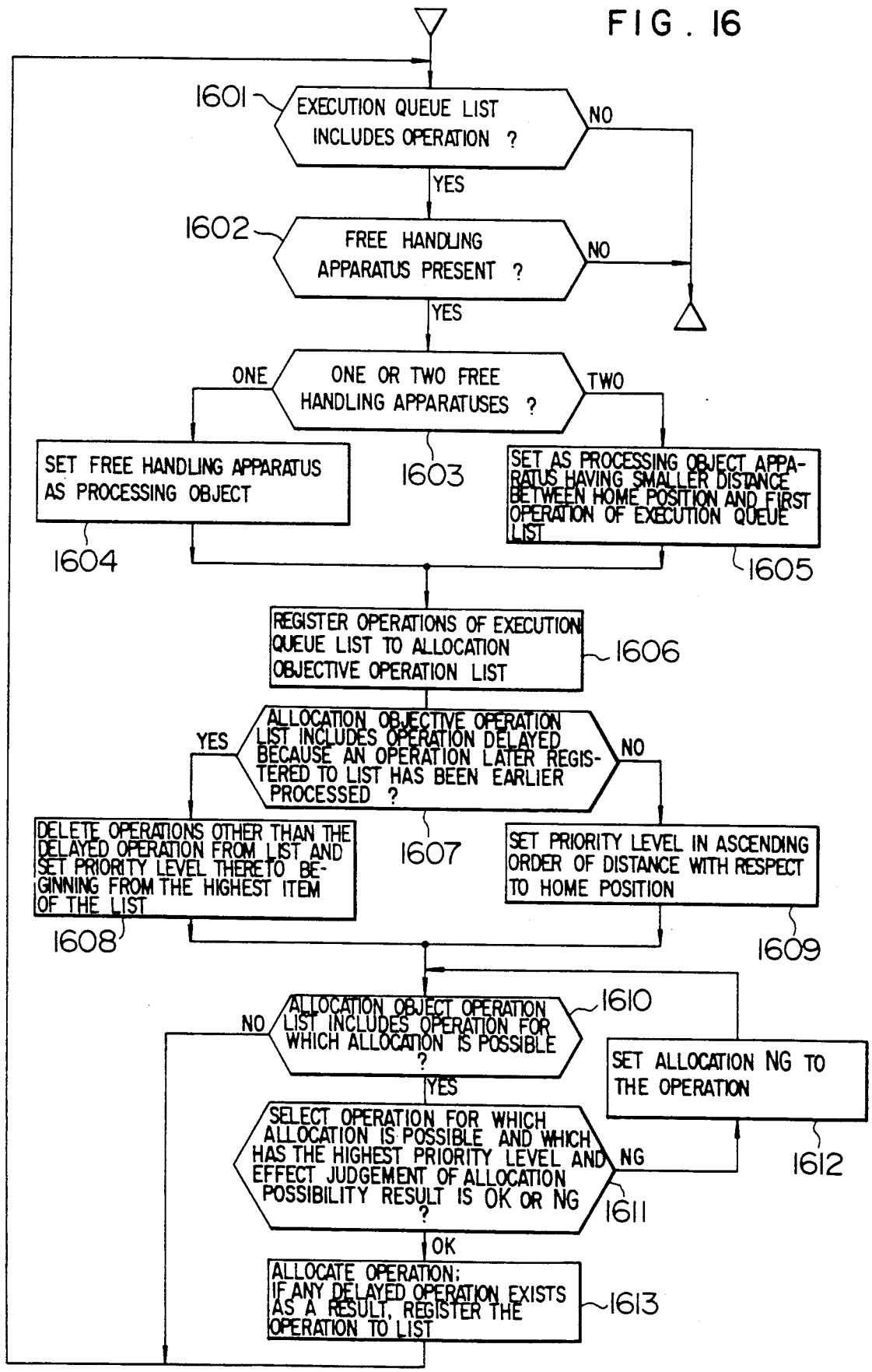
FIG. 16 is a flowchart showing a handling apparatus allocation procedure in which allocation possibility is to be judged.

Next, description will be given of an allocation method in a case where a check is conducted to determine whether or not an interference occurs between an operation and an operation being effected by another handling apparatus such that based on a result of the check, and it is determined to allocate the operation or to reserve the allocation of the operation (refer to FIG. 16 for details). The allocation possibility is, however, judged depending on the conditions of FIG. 18. By use of the condition judge expressions of FIG. 18, discrimination of the following two cases is effected based on positional relationships between the start and end points of an operation to be allocated and those of an operation being executed. In a first case, the allocation is carried out; whereas in a second case, the allocation is reserved so as to be achieved later.

Case 1: The respective handling apparatuses can achieve independently of each other either one of or both of an operation to move up to the start point of the operation and to take out a medium from the shelf (to be called a pick-up operation) and an operation to transport the medium up to the end point of the operation and to store the medium therein (to be called a store operation).

Case 2: In any case of the operations above, there occurs a wait state due to an interference between the handling apparatuses.

Next, description will be given of a specific procedure to effect an operation allocation in accordance with the condition judgement above.

Step 1601: Judgement is conducted to determine whether or not the execution queue list (FIG. 15) includes operations. If this is the case, processing proceeds to step 1602; otherwise the processing is terminated.

Step 1602: A check is achieved to determine whether or not there exists a handling apparatus in the free state. If this is the case, processing proceeds to step 1603; otherwise the processing is terminated.

Step 1603: The system judges to determine the number of the free handling apparatuses. If the number is one, control is passed to step 1604; if two, step 1605 is executed.

Step 1604: The free handling apparatus is set as a processing object, and then control is transferred to step 1606.

Step 1605: The system examines a distance between the home position of the handling apparatus (the left end of the storage system for the left-hand apparatus; the right end of the storage system for the right-hand apparatus) and the operation position (for example, an intermediate point between the first and end points of the operation) such that the handling apparatus having the smaller value of the distance is set as the processing object, and then processing proceeds to a procedure 1606.

Step 1606: The allocation objective operation list (FIG. 17) is cleared; thereafter, from the operations registered to the execution queue list, two operations having the higher levels with respect to the registration time, namely, having the earlier registration time are selected so as to be registered to the allocation objective operation list.

Step 1607: The system judges to determine whether or not the allocation objective operation list includes any operations which are delayed because an operation later registered has been earlier processed. If this is the case, control is passed to step 1608; otherwise, the processing proceeds to a procedure 1609.

Step 1608: The operations other than those thus delayed are deleted from the allocation objective operation list; thereafter, the priority levels are assigned to the operations remaining as a result in an ascending order of the registration time, namely, beginning from the first registered operation.

Step 1609: The system examines a distance between the home position of the objective handling apparatus and the position of each operation in the allocation objective operation list such that the priority levels are assigned thereto in an ascending order of the distance.

Step 1610: A check is conducted on the contents of the allocation objective operation list so as to determine whether or not the list includes any operations for which the allocation possibility judgement results in OK. If this is the case, control is transferred to step 1611; otherwise, the operation allocation is terminated for the objective handling apparatus and the processing proceeds to a procedure 1601.

Step 1611: From the operations for which the judgement results in OK, the system selects an operation having the highest priority level so as to determine the result, OK or NG, of the judgement effected based on the allocation possibility conditions of FIG. 18. For the result of OK, control is passed to step 1613; whereas for NG, processing proceeds to step 1612.

Step 1612: A condition that the operation is associated with the result of NG is registered to the allocation objective operation list, and then control returns to the step 1610.

Step 1613: The operation is allocated to the objective handling apparatus and is then deleted from the execution queue list. In a case where there occurs an operation (delayed operation) satisfying all the following conditions as a result, a condition that the pertinent operation is a delayed operation is registered to the execution queue list.

Condition 1: An operation which is not allocated and which is remains in the execution queue list as a result of the sequence of allocate processing above.

Condition 2: An operation registered to the execution queue list in advance of time as compared with the operation allocated in the step 1613.

Condition 3: An operation in an area of the handling apparatus allocated in the step 1613.

After the delayed operation is completely registered, control returns to the step 1601.

According to the present invention, the respective handling apparatuses of the automatic information medium storage system can effect operations in a parallel fashion without causing any interference therebetween. In consequence, it is possible to reduce a period of time required for an operation and to increase the amount of the operation to be effected in a unit of time.

While particular embodiments of the invention have been shown and described, it will be obvious to those skilled in the art that various changes and modifications may be made without departing from the present invention in its broader aspects.

We claim:

1. An information medium storage system comprising:
    a medium storage shelf for storing information media therein;
    a plurality of information means for recording information on the information media and/or for reproducing information recorded thereon;
    means for subdividing an existing area of said storage shelf into a plurality of subareas, each of said subareas having at least one of said information means assigned thereto;
    plurality of handling means for extracting the information media from said storage shelf so as to mount the information media on said information means and for demounting the information media from said information means so as to restore the information media in said storage shelf; each of said plurality of handling means capable of extracting the information media from any of said subareas;
    means, operative in a mount operation for a requested information media or in a document operation for an information media already being used, for selecting at least one of said information means assigned to one of said subareas of said storage shelf based on a predetermined selection criterion which takes into account a distance between one of said information means and said storage shelf, and denotes a possible of an occurrence of an interference between said handling means; and
    means for allocating the mount or demount operation to one of said handling means which is assigned said subarea corresponding to the operation based on a predetermined allocation criterion which denotes an existence of a minimized possibility of an occurrence of an interference between said handling means at a time when the allocated operation is executed, at a time preceding the execution time or at both of the times.

2. An information medium storage system according to claim 1, wherein said predetermined allocation criterion is a possibility of an occurrence of an interference between operation of the handling means at a time when the allocated operation is executed, at a time preceding the execution time, or at both of the times.

3. An information medium storage system according to claim 1, wherein said selecting means includes means for selectively selecting one of said information means assigned to said subarea in which said selected information media exists.

4. An information medium storage system according to claim 3, wherein said select means includes means operative in a case where because it is impossible to select one of said information means assigned to one of said subareas, for selecting an optimal information means by use of, as a selection criterion, a distance between one of said information means and the medium storage shelf, a possibility of an occurrence of an interference between said handling means, or both the distance and the possibility.

5. An information medium storage system according to claim 1, wherein said allocating means includes means for limiting assigning accessible subareas for each of said handling means and allocating an operation to each handling means so as to execute the operation in its assigned subarea.

6. An information medium storage system according to claim 5, wherein said allocating means includes means, operative in a case where because it is impossible to allocate the operation to handling means which operates in the subarea, for allocating said operation to be processed to an other handling means assigned to said subarea thereby effecting an allocation by selecting an optimal operation such that there exists a minimized possibility of an occurrence of an interference between the handling means at a time when the allocated operation is executed, at a time preceding the execution time, or at both of the times.

7. An information medium storage system according to claim 5, wherein said allocating means includes means, operative in a case where there are a plurality of operations to be processed by said handling means, for selecting an optimal operation such that there exists a minimized possibility of an occurrence of an interference between the handling means at a time when the allocated operation is executed, at a time preceding the execution time, or at both of the times.

8. An information medium storage system according to claim 7, wherein said allocating means includes means, operative in a case where even when an optimal operation is selected from a group of operations associated with a handling means, there exists a possibility of a performance reduction due to an interference with another of said handling means if the operation is executed, for reserving an allocation of the operation to said handling means.

9. An information medium storage system according to claim 8, wherein said allocating means includes:
examining means for selecting an optimal operation from a group of operations from which a reserved operation is removed in a case where allocation of an optimal operation to the handling means is reserved for examining a possibility of an interference; and
means for determining whether the operation is to be allocated or the allocation is to be reserved in accordance with a result of said examination.

10. An information medium storage system according to claim 9, wherein said examining means includes means for examining a possibility of an occurrence of an interference between an operation to be allocated to said handling means and an operation being executed or to be executed by another of said handling means depending on a start point and an end point of each of said operations and a position of each of said handling means.

11. An information medium storage system according to claim 1, wherein said selecting means includes means for establishing a measure indicating a period of time that has elapsed from a specified point in time such that a selection of one of said information means is controlled depending on said measure.

12. An information medium storage system according to claim 1, wherein said allocating means includes means for establishing a measure indicating a period of time that has elapsed from a specified point in time such that an allocation of one of said handling means is controlled depending on said measure.

13. An information medium storage system according to claim 1, wherein said selecting means includes means, operative in a case where information means is selected based on a selection criterion other than the predetermined selection criterion and where it is preferable to use the information means selected based on predetermined selection criterion, for managing the relationship between an information means selected based on the predetermined criterion and one selected based on the other selection criterion, and means for selecting information means based on the other selection criterion so as to use the selected one for virtual use of the selected information means so as to actually employ an information means selected depending on the predetermined selection criterion and for dynamically controlling correspondence relationships between the virtually used information means and the information means actually employed each time a selection of one of said information means is effected.

14. An information medium storage system comprising
a medium storage shelf for storing information media therein;
a plurality of information means for recording information on the information media and/or for reproducing information recorded thereon;
a plurality of handling means for extracting the information media from said storage shelf so as to mount the information media on said information means and for demounting the information media from said information means so as to restore the information media in said storage shelf;
means for subdividing an existing area of said storage shelf into a plurality of subareas, each of said subareas having at least one of said information means assigned thereto;
means for determining for each of said handling means a first one of the subareas and a second one of said subareas to be processed by said handling means;
means, operative in a mount operation for a requested information media or in a demount operation for an information media already being used, for selecting at least one of said information means assigned to one of said subareas which corresponds to said information media based on a predetermined selection criterion;

means for allocating, based on a predetermined allocation criterion, the mount or demount operation to one of said handling means in which either one of said first and second ones of said subareas possessed by said handling means corresponds to said subarea in which said mount or demount is to be performed; and means for effecting a control operation such that said handling mean effects the mount or demount operation by satisfying a predetermined operation criterion;

wherein said allocating means includes means for limiting accessibility of said storage shelf and said information means from each of said handling means so as to predetermined an operation area for each of said handling means; and wherein said allocating means includes rearranging means, operative in a case where a group of information media to be frequently used simultaneously are stored in a particular operation area among plural operation areas, for rearranging a portion of the group of the information media to another operation area so as to avoid a concentration of an operation load onto a particular handling means.

15. An information medium storage system according to claim 14, wherein said rearranging means includes means for collecting actual usage data including which one of groups of information media are simultaneously used during an operation of an automatic storage system and for analyzing the collecting data at a fixed interval so as to detect, based on a result of the analysis, whether or not any one of the groups of information media to be frequently used simultaneously are stored in a particular operation area in a concentrated fashion.

16. An information medium storage system according to claim 15, further including means, operative in the collection of the actual usage data, for assigning a weight for each data item such that latest data items are emphasized and such that past data items are ignored.

17. A method of storing information media in a system including a medium storage shelf for storing information media therein; a plurality of information means for recording information on the information media and for reproducing information recorded thereon; a plurality of handling means for extracting the information media from said storage shelf so as to mount the information media on said information means and for demounting the information media from said information means so as to restore the information media in said storage shelf control means for controlling operations of said means; and means for subdividing an existing area of said storage shelf into a plurality of subareas, each of said subareas having at least one of said information means assigned thereto, each of said plurality of handling means capable of extracting the information media from any of said subareas said method effected by said control means comprising the steps of:

processing, operative in a mount operation for a requested information media or in a demount operation for an information media already being used, for selecting at least one of said information means assigned to one of said subareas of said storage shelf based on a predetermined selection criterion which takes into account a distance between one of said information means and said storage shelf, and denotes a possible occurrence of an interference between said handling means;

processing for allocating the mount or demount operation to one of said handling means which processes the subarea corresponding to the operation, based on a predetermined allocation criterion which denotes an existence of a minimized possibility of an occurrence of an interference between said handling means at a time or preceding a time when the allocated operation is executed; and processing for effecting a control operation such that said handling means effects the mount or demount operation by satisfying a predetermined operation criterion.

* * * * *